March 14, 1939.  C. MOSIER ET AL  2,150,238
INSULATING TAPE
Filed Oct. 29, 1936  3 Sheets-Sheet 1
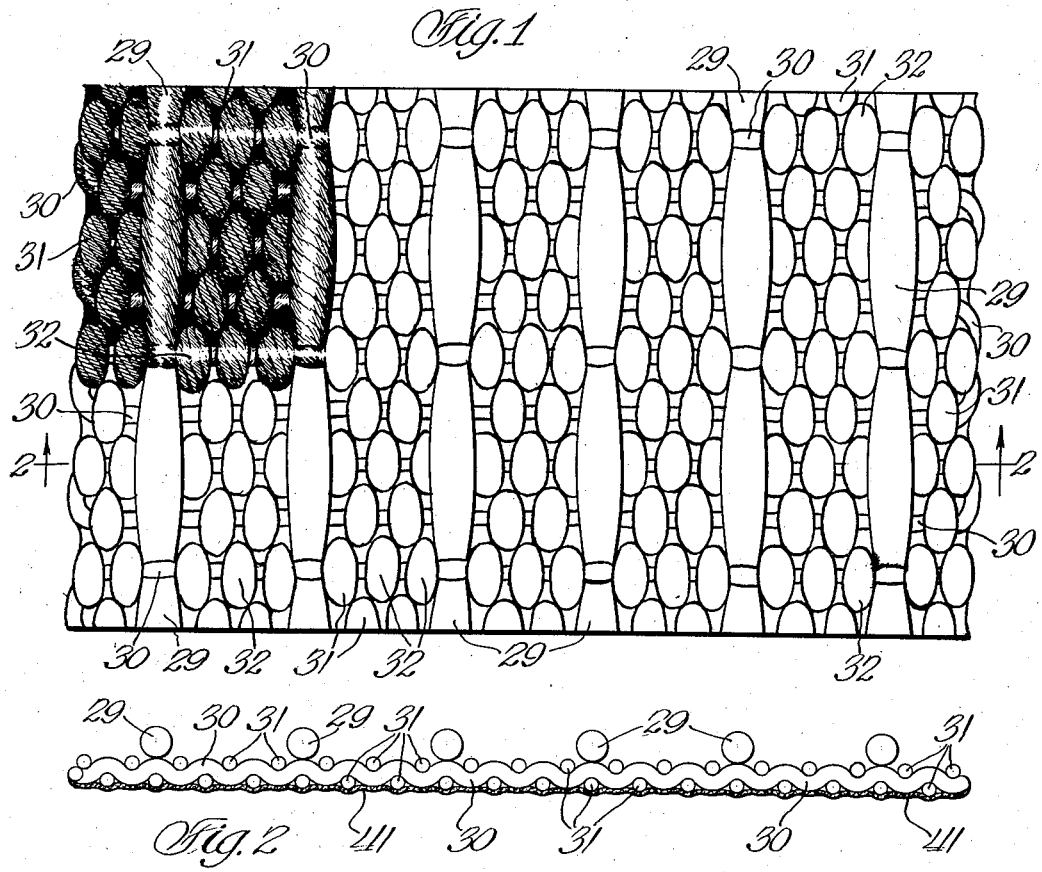
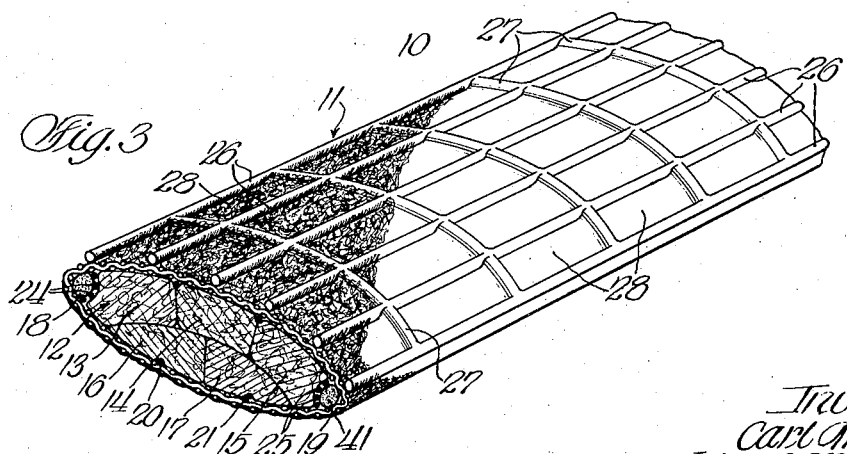
Inventors:
Carl Mosier
John L. Mohun Jr.
By Williams, Bradbury, McCaleb & Hinkle
Attys.

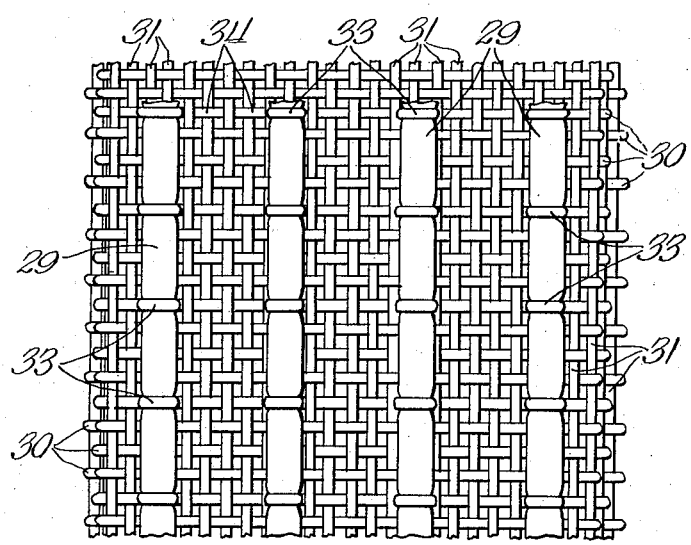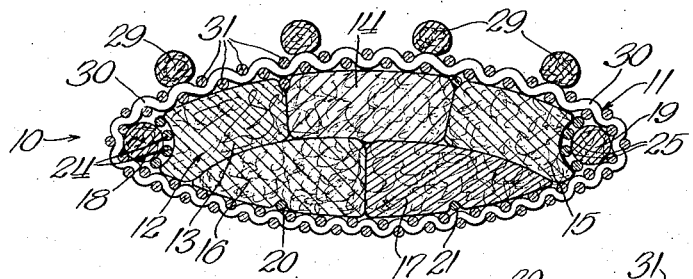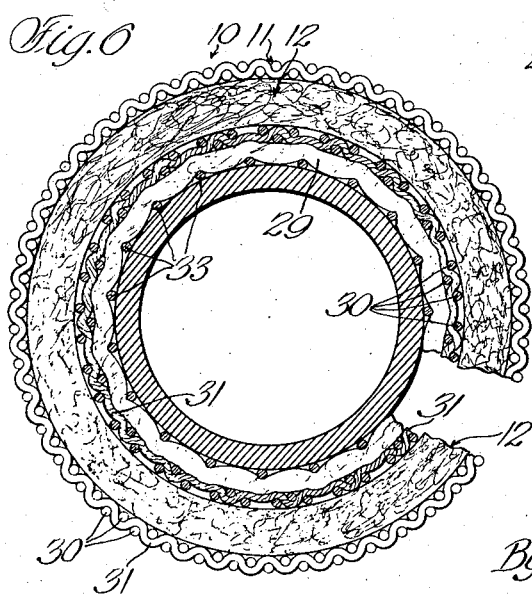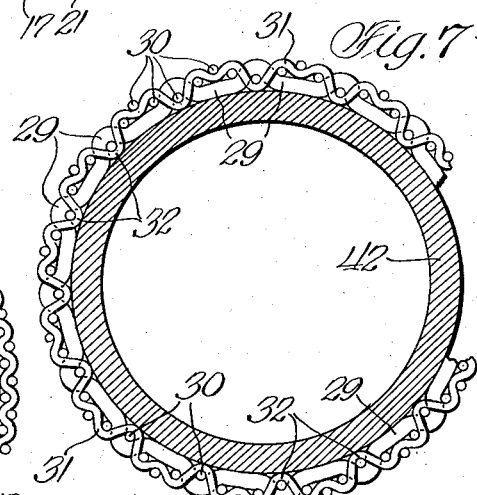

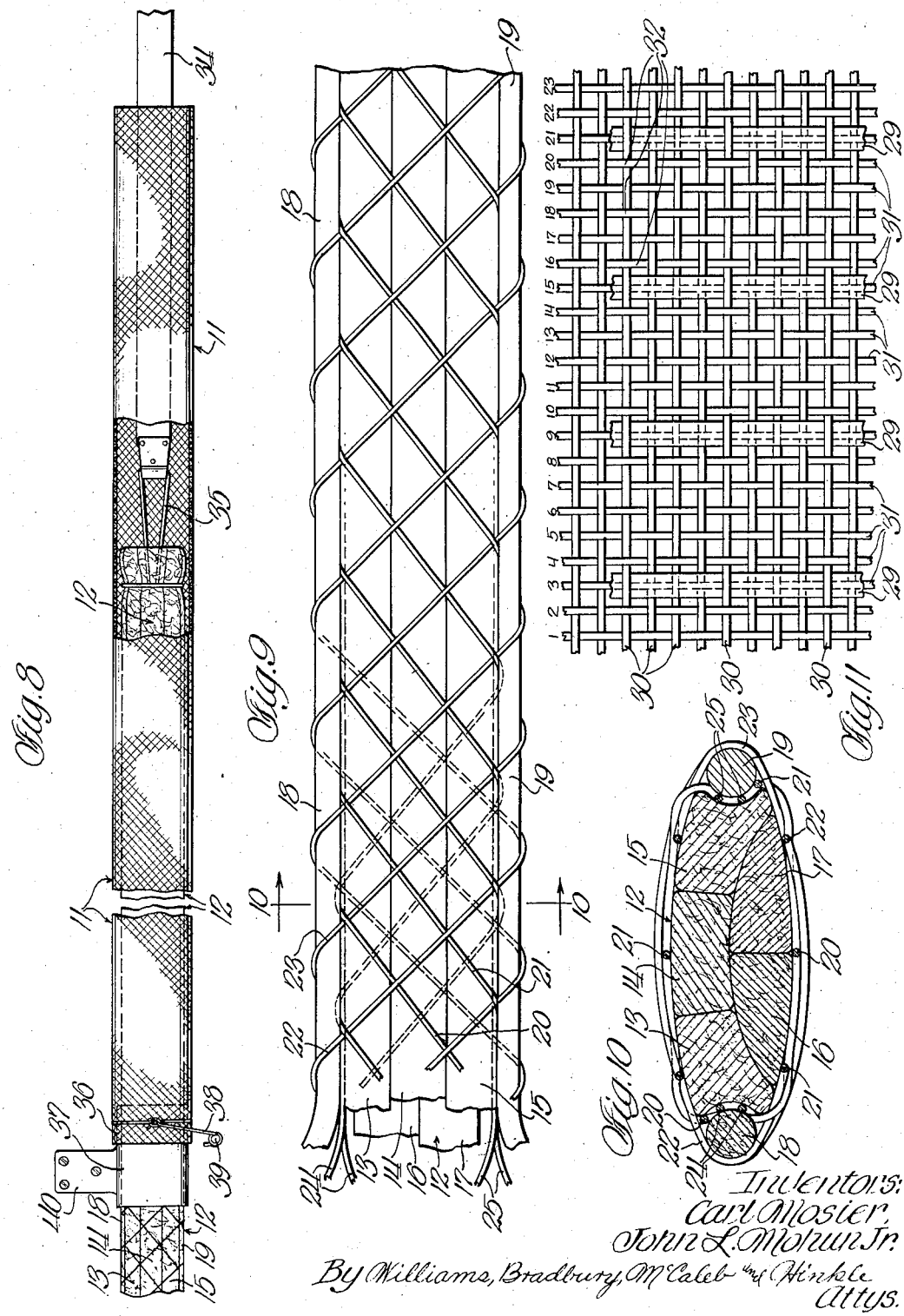

Patented Mar. 14, 1939

2,150,238

UNITED STATES PATENT OFFICE 2,150,238

INSULATING TAPE

Carl Mosier and John L. Mohun, Jr., Chicago, Ill., assignors to Union Asbestos & Rubber Company, Chicago, Ill., a corporation of Illinois Application October 29, 1936, Serial No. 108,170

3 Claims. (Cl. 154—44)

The present invention relates to insulating tape and methods of making the same, and is particularly concerned with tape of the type having a woven sheath of an insulating filler.

The present application relates to the complete insulating tape including the filler and sheath; the method, apparatus, sheath, and listing tape have been made the subject of further applications, Ser. No. 238,204, filed November 1, 1938, Methods of making insulating tape; Ser. No. 199,752, filed April 4, 1938, Apparatus for making insulating tape; and Ser. No. 199,753, filed April 4, 1938, Insulating tape.

One of the difficulties encountered in tape of this type is the fact that when the tape is spirally wound upon a pipe the tape, which is in the form of a flat tube filled with insulation, tends to bunch together in the middle and to become thin at the edges of the sheath.

One of the objects of the invention is the provision of an improved tape which is adapted to prevent the thinning of the edges of the tape and to give a substantially uniform insulation value over the full area of the pipe.

Another object of the invention is the provision of an improved tape structure which is adapted to entrap air between the tape and the pipe in dead air spaces and to increase the insulating value of the assembly by virtue of this improved action and structure.

Another object of the invention is the provision of an improved filler structure which is adapted to be drawn into an insulating tape sheath with greater facility by virtue of its improved structure, which gives it greater tensile strength, and which tends to cause the filler to contract into a smaller space while the filler is being drawn into the sheath.

Another object of the invention is the provision of an improved method of manufacture of insulating tape of the class described.

Other objects and advantages of the invention will be apparent from the following description and the accompanying drawings, in which similar characters of reference indicate similar parts throughout the several views.

Referring to the three sheets of drawings,

Fig. 1 is an enlarged bottom plan view of a section of tape constructed according to the present invention on a scale three times as large as the tape;

Fig. 2 is a transverse sectional view taken on the plane of the line 2—2 of Fig. 1, showing the details of the weave;

Fig. 3 is a view in perspective of a fragment of insulating sheath constructed according to the present invention, the bottom or inside of the sheath being uppermost;

Fig. 4 is a diagrammatic bottom plan view of a portion of sheath showing the weave of the sheath;

Fig. 5 is a transverse sectional view through the sheath of Fig. 4, showing the details of the weave and arrangement of the filler;

Fig. 6 is a section taken through a pipe to which the sheath has been applied, the section running longitudinally of the tape as it is arranged spirally on the pipe;

Fig. 7 is a view similar to Fig. 6 of a fragment of the pipe covered with a tape of insulating material woven according to the structure of Fig. 1;

Fig. 8 is a top plan view in partial section of an insulating sheath in the process of being filled with the insulating filler;

Fig. 9 is a full size top plan view of filler constructed according to the present invention;

Fig. 10 is a transverse sectional view through the filler, taken on the plane of the line 10—10 of Fig. 9, looking in the direction of the arrows;

Fig. 11 is a diagrammatic plan view of a portion of a sheath, showing the arrangement of the weft and warp threads in one embodiment of the invention.

Referring to Fig. 3, the present insulating tape, which is indicated in its entirety by the numeral 10, preferably comprises a woven insulating sheath 11, which is tubular in shape, and which is provided with an insulating filler, indicated in its entirety by the numeral 12.

The filler preferably consists of a plurality of large, loose and soft rovings of asbestos fibers, the rovings being indicated by the numerals 13, 14, 15, 16 and 17.

These rovings may be made of relatively long fibers or short fibers, and in some cases other insulating fibers, such as vegetable or animal fibers, may be used. In the preferred embodiment of the invention the rovings have very little or practically no tensile strength, although a slight amount of vegetable fibers may be included to increase the tensile strength of the rovings to facilitate handling of the rovings during the manufacture of the filler 12.

These rovings are preferably so arranged that they overlap each other; that is, the rovings 16 and 17 are disposed over the crack between the rovings 12 and 13 and 14 and 15 respectively. When the filler is complete, the rovings flatten out to an elongated structure, which may be substantially rectangular in cross section.

The filler 12 also preferably includes at each edge an asbestos rope 18, 19, which comprises asbestos or other fibers tightly twisted together, for the purpose of giving the filler a greater tensile strength.

The rovings 13 to 17 may be secured together by a plurality of threads 20, 21 and others extending spirally around the assembly 12—17 in a left hand direction as viewed in Fig. 9, and by a plurality of other threads 22, 23, and others which extend spirally around the assembly 13—19 in the opposite or right hand direction. These spiral threads 20—23 and others form a basket weave about the rovings and ropes and hold the parts of the filler together. When the spirally extending threads 20—23 are subjected to longitudinal tension with the rest of the filler, they tend to cause the filler to contract into a smaller space so that it can be more readily inserted in its sheath.

The ropes 18, 19 give the filler a tensile strength which enables it to be drawn into the sheath 11 in substantial lengths, such as, for example, fifty feet, more or less. In addition to the threads 20—23, other longitudinally extending threads 24, 25 may be arranged at the edges of the rovings to increase the tensile strength of the assembly. It should be understood that any number of rovings may be used, and rovings are preferably used in the preferred form of the invention. In some embodiments of the invention, however, other forms of flat fillers of less insulating value might be used with the improved sheath.

Referring to Fig. 3, this shows the outside of an improved form of sheath or of a tape which has on its rear side, that is, the side which is innermost to the pipe when the tape is spirally wound on a pipe, a plurality of insulating ropes or large threads 26 extending longitudinally of the sheath, and a plurality of relatively large thread formations 27 extending transversely of the sheath and intersecting the thread formations.

This forms depressed rectangular spaces 28 between the thread formations 26, 27, and the depressions 28 are adapted to entrap air between the sheath and the pipe when the sheath is spirally wound on a pipe or when it is applied to any other surface. This greatly increases the insulating value of the sheath and causes this increase at a slight additional cost, which is not proportionate to the increased value of the tape.

The structure of Fig. 3 may be accomplished in different ways, one example being the addition to the sheath of longitudinally and transversely extending relatively large threads or ropes of asbestos.

In the embodiment of Fig. 1, however, additional longitudinally extending large threads or ropes 29 have been used, located on the lower outside of the sheath and equally spaced from each other. In this embodiment 30 indicates the weft threads and 31 the warp threads. Every fourth weft thread extends over the large thread or rope 29 and binds it to the woven assembly. Thus, for example, the large thread or rope 29 in Fig. 1 is secured by the weft thread 30 at the bottom, the woven thread 30 at the middle of the figure, and left thread 30 at the top.

The weft threads 30 may be drawn so tightly in the weaving that they cause the portions 32 of the warp threads 31 to project outward above the rest of the surface of the weave. In other words, the thread portions 32 project outward substantially as much as the ropes 29. This gives the appearance of the sheath on that side a waffle-like formation, as shown in Fig. 3, the transverse ridges being formed by the outwardly projecting portions 32 of the warp threads 31.

The arrangement of the weave may be seen in greater detail with reference to Fig. 11, in which the warp threads have been numbered 1 to 23. The ropes or large threads 29 have been arranged in the figure on top of the warp threads 3, 9, 15, and 21, and they are secured by engagement with the weft threads 30.

Referring, now, to Figs. 4 and 5, this is a modification in which the weft threads which secure the external ropes 29 in place have been arranged with relatively loose, outwardly projecting loops at the points 33, where they extend about the ropes 29. In such case the intermediate portions 34 of the weft threads 30 do not fill the warp threads 31 outward as described at point 32 in Fig. 3. That portion of the weave which is located between the ropes 29 is substantially flat.

In this embodiment of the invention the inner side of the tape is provided with longitudinally extending ridges 29, which space the bottom of the tape sheath from the pipe and provide dead air spaces when the tape is spirally wound on the pipe, as shown in Fig. 6.

It should also be understood that the advantages of the weave of Fig. 1 or 4 may be utilized in an insulating covering as shown in Fig. 7, separate and apart from the filler.

Referring to Fig. 8, this is a diagrammatic view of a part of the apparatus used for filling the sheath 11 with a filler 12. After the sheath has been woven in a length corresponding to the length of the filler to be inserted the filler 12 is attached to an elongated tape 34, adapted to be wound on a drum.

The tape 34 has a stout cord 35 attached to its end and provided with a slip knot extending about the filler 12. The tape 34 is steel and may be readily inserted through the sheath 11 when the sheath 11 is laid out flat on an elongated bench. The leading end 36 of sheath 11 is secured to a tubular collar 37 by means of a cord 38 having a slip knot, and secured to a peg 39.

The collar 37 comprises a metal tubular member adapted to be received in the sheath 11 and supported on a plate 40, which is attached to the table. The steel tape 34, after being inserted through the sheath 11 and attached to the filler 12, is then wound on the drum (not shown), drawing the tape 34 to the right, and drawing the filler 12 into the sheath 11. Obviously, the method could be carried out by hand also, by pulling on the steel tape 34.

The basket weave 20—23 about the filler 12 tends to cause the filler to contract somewhat as it is subjected to tension and drawn into the sheath 11, but as soon as the tension is relieved on the filler, the filler expands into the sheath 11, filling it and forming a flat, ribbon-like member.

Referring to Fig. 6, this is a sectional view through a pipe, to which the insulating material constructed according to Fig. 4 has been applied. It will thus be observed that the cords 29 run spirally about the pipe 41 and separate the space between the sheath and the pipe into dead air spaces.

In Fig. 7 this is a modification in which an unfilled tape is applied to a pipe 42, the woven tape being provided with longitudinally extending cords 29, arranged as shown in Fig. 1, to provide longitudinally and transversely extending ribs as in Fig. 3.

The external face, that is, the face opposite to the cords 29, may be provided with a waterproof layer 41 according to the method disclosed in Gillies Patent No. 1,937,561, issued December 5, 1933, to provide an insulating tape of the type shown in Gillies Patent No. 1,903,106, issued March 28, 1933, for Waterproof heat insulating tape.

It will thus be observed that we have invented an improved insulating tape having an improved sheath and an improved filler. The sheath is so constructed as to provide dead air spaces between one of its faces and the pipe to which it is applied, thereby greatly increasing the insulating value of the assembly.

The filler is provided with longitudinally extending ropes at each edge, which prevent the thinning or feathering of the tape at its edges as it is applied to the tape, and these ropes are very economically applied, since they are a part of the filler assembly and do not require any special sheath.

The present filler is so constructed that it has sufficient tensile strength to be drawn into the tape, and when it is once inside the sheath it causes the sheath to assume a ribbon-like form of uniform thickness.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In an insulating tape, the combination of an insulating filler with a woven fabric sheath adapted to envelop said filler, said fabric comprising a plurality of warp threads and weft threads, and certain of the warp threads on one face being larger whereby a plurality of longitudinal spaced ribs are formed on said face to form dead air spaces on a pipe when the tape is wrapped about a pipe, and certain of the transversely extending weft threads being drawn tighter than the other weft threads and the majority of warp threads for the purpose of forming intersecting transverse spaced ribs on the same face of said sheath as said longitudinal spaced ribs.

2. In an insulating tape, the combination of an insulating filler with a woven fabric sheath adapted to envelop said filler, said fabric comprising a plurality of warp threads and weft threads, and certain of the warp threads on one face being larger whereby a plurality of longitudinally spaced ribs are formed on said face to form dead air spaces on a pipe when the tape is wrapped about a pipe, and certain of the transversely extending weft threads being drawn tighter than the other weft threads and the majority of warp threads for the purpose of forming intersecting transversely spaced ribs on the same face of said sheath as said longitudinally spaced ribs, said filler comprising a plurality of large, loose, soft rovings of insulating material, said rovings being assembled in overlapping relation and having a plurality of spirally wound cords wrapped about said rovings for holding said rovings in predetermined position and to provide the rovings with sufficient tensile strength to be drawn into said sheath.

3. In an insulating tape, the combination of an insulating filler with a woven fabric sheath adapted to envelop said filler, said fabric comprising a plurality of warp threads and weft threads, and certain of the warp threads on one face being larger whereby a plurality of longitudinally spaced ribs are formed on said face to form dead air spaces of a pipe when the tape is wrapped about a pipe, and certain of the transversely extending weft threads being drawn tighter than the other weft threads and the majority of warp threads for the purpose of forming intersecting transversely spaced ribs on the same face of said sheath as said longitudinally spaced ribs, said filler being provided with a pair of relatively hard ropes of insulating material of greater tensile strength, and said ropes being located at each edge of said filler.

CARL MOSIER.
JOHN L. MOHUN, Jr.